Figure 1:
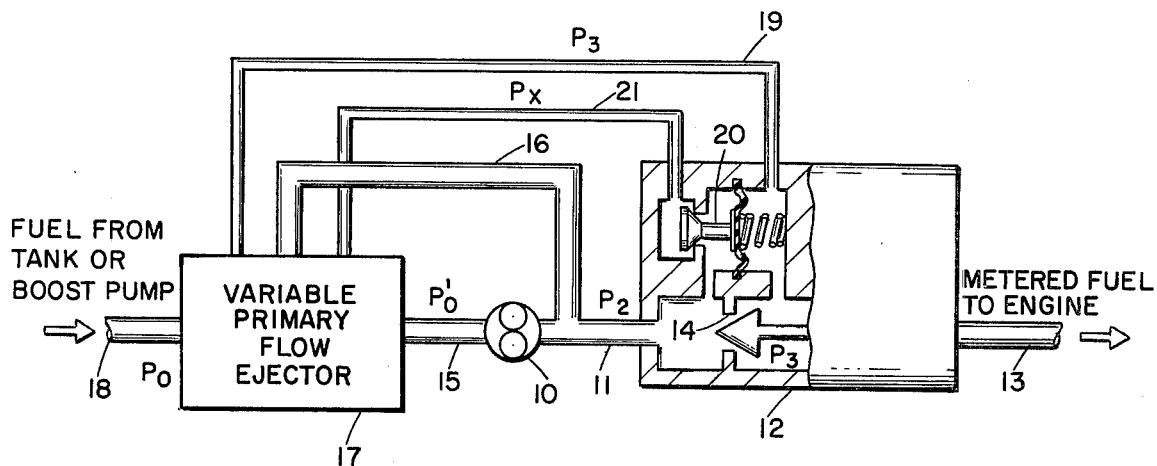

United States Patent [19]

Rogers et al.

[11] 4,213,741
[45] Jul. 22, 1980

[54] VARIABLE FLOW EJECTOR

[75] Inventors: Francis R. Rogers; James M. Eastman, both of South Bend, Ind.

[73] Assignee: The Bendix Corporation, Southfield, Mich.

[21] Appl. No.: 950,954

[22] Filed: Oct. 13, 1978

[51] Int. Cl.² ............................................. F04B 23/04
[52] U.S. Cl. .................................... 417/79; 137/117; 417/87
[58] Field of Search ................... 137/117; 417/87, 197, 417/184, 189, 187, 79, 80; 60/39.28 R

[56] References Cited

U.S. PATENT DOCUMENTS

| | | | |
|---|---|---|---|
| 3,043,107 | 7/1962 | Magnus, Jr. | 417/79 |
| 3,106,934 | 10/1963 | Rogers et al. | 137/117 |
| 3,531,936 | 10/1970 | Widell | 137/117 X |
| 3,736,072 | 5/1973 | Turner et al. | 417/79 |
| 3,922,113 | 11/1975 | Turner | 417/184 X |

Primary Examiner—William R. Cline
Attorney, Agent, or Firm—Bruce L. Lamb; William G. Christoforo; Leo H. McCormick, Jr.

[57] ABSTRACT

A variable flow ejector for use in controlling the amount of bypass flow in a fluid delivery system which includes a pump, a metering orifice and a bypass line for circulating a variable amount of flow from the pump outlet to the pump inlet to control the pressure drop across the orifice. The bypass flow enters the ejector through a variable area nozzle coaxially disposed with respect to a stream from a source of fluid whereby the velocity head of the bypass flow is recovered as pressure head at the pump inlet for increased efficiency. The bypass flow is controlled by varying the area of the ejector nozzle as a combined function proportional to the pressure drop across the orifice plus the time integral of the error in the pressure drop across the orifice.

11 Claims, 2 Drawing Figures

VARIABLE FLOW EJECTOR

The present invention relates to flow ejectors in engine fuel pump systems. More particularly, it relates to a variable geometry ejector which returns bypassed excess flow from the outlet of a constant displacement pump to the inlet thereof wherein the geometry is varied by combined proportional and integrating control means.

Fuel supply systems for aircraft turbine engines commonly employ an engine driven constant displacement pump as the principal fuel mover. Such pumps characteristically provide substantially greater fuel delivery than is demanded by the engine under all except full load conditions. In order to control fuel pressure to the engine fuel metering means the excess pump flow is returned to the pump inlet through a bypass control valve.

U.S. Pat. No. 3,106,934 issued Oct. 15, 1963 to F. R. Rogers et al. for "Integrating and Proportional Flow Control Apparatus" discloses a bypass control valve which provides fast, accurate and stable control of the fuel pressure to the engine fuel meter under a wide range of load conditions. However, in the Rogers et al. control little heed is taken of the desirability of returning excess flow to the pump inlet with minimum loss of energy. As a result, the Rogers et al. control suffers a loss of efficiency.

U.S. Pat. No. 3,922,113 issued Nov. 25, 1975 to H. G. Turner for "Metered Supply of Liquids" discloses a bypass control valve which includes a variable geometry ejector capable of recovering a substantial amount of the kinetic energy of the bypass stream as potential energy at the pump inlet. System energy losses are thereby reduced and a substantial increase in efficiency is obtained. However, in Turner's system the ejector geometry is varied only as a proportional function of the fuel meter pressure error. In such a case, as is discussed in the Rogers et al. patent, a steady state error always exits in the fuel meter pressure.

It is an object of the present invention to provide a fuel delivery system of improved accuracy and efficiency.

It is a further object of the invention to provide, in a fuel delivery system employing a constant displacement pump, means for controlling fuel meter pressure in which maximum energy is recovered from pump bypass flow while maintaining accurate meter pressure over a wide range of engine fuel demand.

It is another object of the invention to provide, for use with a constant displacement pump, a bypass control valve in which the bypass or primary flow is injected axially into a secondary core stream as a conical sheet with further secondary flow being admitted downstream of the point of injection, thereby affording maximum entrainment of secondary flow by the bypass flow and attendant increase in the efficiency of conversion of kinetic energy of the bypass flow to potential energy in the secondary stream.

Still another object of the invention is to provide a bypass control valve having the above attributes of flow entrainment wherein the area through which the bypass flow is injected is controlled as a combined proportional and integral function of the fuel meter pressure error.

Briefly, the invention comprises an ejector body into which a secondary stream is admitted. After entering the body a portion of the secondary stream is conducted through a slidable tubular member having a spring loaded piston attached thereto and means for applying a pressure error signal to the piston. The downstream end of the tubular member is surrounded by a convergent body mounted upon a second piston which is also slidable within the body and which has an axial bore aligned with the tubular member to conduct fluid outside the body. The position of the second piston is a function of the time integral of the pressure error signal. Primary fluid, i.e. the pump bypass flow, is admitted to the ejector body so as to surround the downstream end of the tubular member and enter the upstream end of the convergent body whence it is ejected through the variable area nozzle formed between the lip of tubular member and the wall of the convergent body into the core stream. Additional secondary fluid is admitted to the ejector body so as to surround the exterior of the convergent body and be entrained as an outer flow layer by the core stream discharged from the convergent body.

Figure 2:
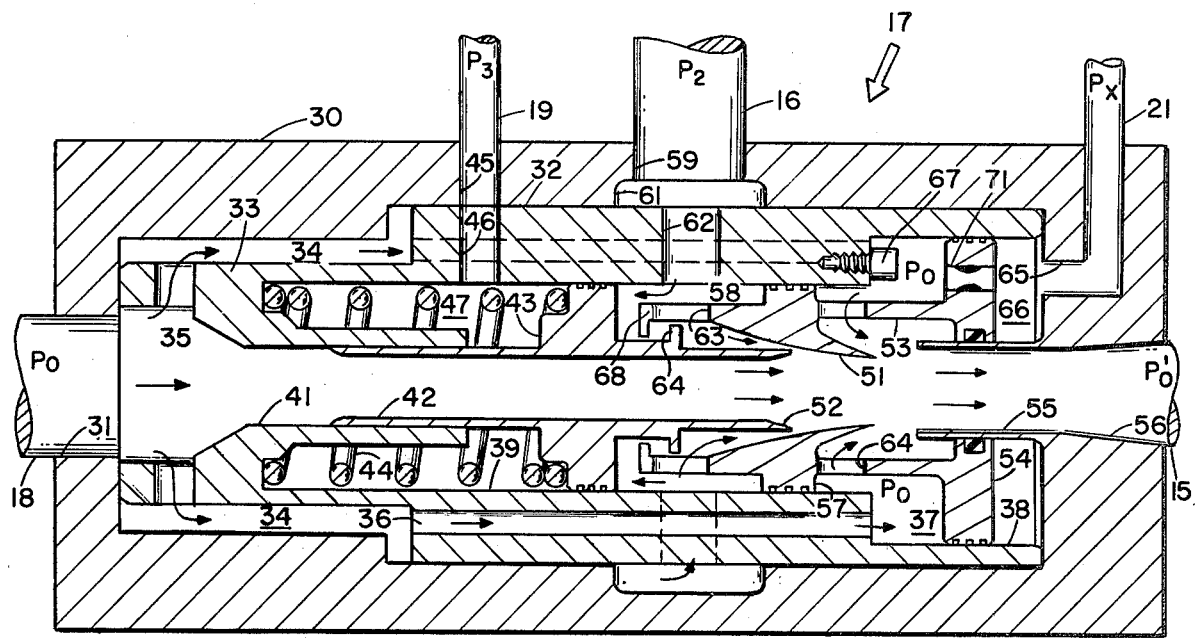

In the drawings:

FIG. 1 is a functional block diagram of an engine fuel supply system showing the application of the present invention; and FIG. 2 is a cross-section of the ejector of the invention.

FIG. 1 illustrates a fuel supply system for an aircraft engine in which the principal moving force for the fuel is a constant displacement pump 10. Pump 10 is driven by the aircraft engine and normally supplies flow in excess of engine demand at a pressure $P_2$. Fuel consumed by the engine passes through line 11 into an engine fuel metering device 12 thence to the engine combustors through line 13. Metering device 12 includes a variable area orifice 14 through which the engine fuel is metered. In order to provide accurate metering of the engine fuel it is desirable to maintain the pressure drop across orifice 14 constant. Since the pump flow normally exceeds the engine demand the pump output pressure $P_2$ tends to increase as engine demand decreases. In order to stabilize this pressure the excess of the pump output flow is returned to the pump inlet 15 through a bypass line 16 and the flow ejector 17 of the invention. Fuel from a tank or intermediate boost pump enters ejector 17 by line 18 at a pressure $P_0$. Ejector 17 regulates the bypass flow through line 16 so as to control the pump outlet pressure $P_2$ and converts the kinetic energy of the bypass flow to potential energy increasing the pump inlet pressure $P'_0$, thereby reducing the power consumption of the pump and providing additional advantages, such as a reduced temperature rise in the fuel passing through the pump.

Ejector 17 controls the pump bypass flow as a function of the difference between the pump outlet pressure $P_2$ and the fuel pressure $P_3$ downstream of orifice 14 and as a function of the time integral of this pressure difference, which is the pressure drop across orifice 14. Pressure $P_3$ is communicated to ejector 17 through line 19. The pressure command $P_x$ is produced by a regulating valve 20 in the fuel meter 12 and is communicated to ejector 17 through line 21. Valve 20 includes a spring loaded diaphragm to which the pressures $P_2$ and $P_3$ are differentially applied. Movements of valve 20 and changes in the flow through it are basically proportional to changes in the metering pressure drop, $P_2 - P_3$. Control pressure $P_x$ is maintained intermediate between $P_2$ and $P_0$ by the force balance on a differential area piston described with reference to FIG. 2.

Referring to FIG. 2, the ejector 17 of the invention comprises a hollow body 30 having an inlet port 31 into which fuel at pressure $P_0$ from the tank flows through line 18. A fixed sleeve 32 having a portion of reduced diameter 33 at the upstream end thereof is pressed into the body 30. A chamber 34 formed by the clearance space between sleeve portion 33 and the body 30 receives fluid at pressure $P_0$ through ports 35. Several axially aligned holes 36 spaced about the circumference of sleeve 32 convey fluid at pressure $P_0$ forwardly to a chamber 37. Sleeve 32 is bored axially to provide a larger diameter cylinder 38 and a smaller diameter cylinder 39 therein. A tubular section 41 formed integrally with the sleeve 32 extends axially within the cylinder 39. Slidingly fitted in tubular section 41 is a tubular member 42. A piston 43 formed on the outer wall of member 42 is fitted closely to and works within cylinder 39. A compression spring 44 is bottomed in cylinder 39 and bears against piston 43 urging the piston to the right or downstream direction. Fluid at pressure $P_3$ carried by line 19 passes through ports 45 and 46 in the body and sleeve, respectively, to the chamber 47 formed by the wall of cylinder 39, piston 43 and the outer walls of tubular section and tubular member 42. A convergent valve member 51 surrounds the downstream lip 52 of tubular member 42 and forms a part of piston member 53. Piston member 53 carries a larger diameter piston surface 54 which is closely fitted to and works within larger diameter cylinder 38. Surface 54 surrounds and slides upon the fixed tube 55 extending inwardly from the divergent outlet port 56 which is connected to pump inlet line 15. The smaller diameter piston surface 57 formed towards the inner end of member 53 is closely fitted to and works within the smaller diameter cylinder 39 of sleeve 32. Surfaces 54 and 57 on piston 53 provide a differential area force balancing effect to maintain control pressure $P_x$ intermediate between pump delivery pressure $P_2$ and fluid supply pressure $P_o$. The downstream surface of piston 43 and the upstream surface of piston 57 facing piston 43, together with the wall of cylinder 39, form a chamber 58 to which the pump bypass flow is admitted. Bypass line 16 is connected to a port 59 in body 30 which communicates with an annular groove 61 surrounding sleeve 32. Ports 62 connect chamber 58 with groove 61. Bypass flow at pressure $P_2$ in chamber 58 acts on the downstream face of piston 43 tending to move tubular member 42 to the left against the force of spring 44 to increase the separation between lip 52 and the inner wall of convergent valve member 51. Fluid in chamber 58 flows through apertures 63 into the entrance of the variable area nozzle formed by the inner wall of convergent valve member 51 and the facing outer wall of member 42 whence it is ejected as a conical sheet into the core stream of fluid passing axially through member 42. Fluid from chamber 37 exits via apertures 64 to surround the discharge end of member 51 and is entrained by the stream from member 51 as an outer flow surface. A port 65 admits the small control flow carried by line 21 at pressure $P_x$ to the chamber 66 formed between piston surface 54 and the wall of body 30. A stop 67 limits the stroke of piston member 53 to the left and prevents bottoming of the piston in cylinder 38. Relative travel between tubular member 42 and piston member 53 is limited by an inwardly turned shoulder 68 at the end of member 53 and an outwardly turned shoulder 69 on member 42 which abut at the extremes of the relative travel of the members. Preferably, dimensions are selected so that the maximum stroke of piston 54 in cylinder 38 is twice as great as the maximum relative separation between members 42 and 53. A flow restrictor 71 formed in piston 54 connects chambers 66 and 37 and meters a substantially uniform small flow from chamber 66. At null or equilibrium conditions this flow matches the control flow into chamber 66 from line 21 and piston 53 is stationary. Changes in control flow then cause piston 53 to move at a proportionate rate so that its position varies as the time integral of the difference between control flow into and restrictor flow out of chamber 66.

In operation, tubular member 42 is urged leftward (opening direction) by the pressure difference $P_2-P_3$ acting on piston 43. Spring 44 urges member 43 rightward (closing direction). The resultant position of member 42 is therefore proportional to the pressure difference $P_2-P_3$. Piston member 53 is urged rightward (opening direction) by the pressure difference $P_2-P_0$ acting on smaller piston 57. Member 53 is urged leftward (closing direction) by the pressure difference $P_x-P_0$ acting on the larger piston 54 so that member 53 is in force equilibrium when pressure $P_x$ has a value intermediate of the value of $P_2$ and $P_0$. $P_x$ varies in accordance with the departure of the actual from the desired pressure drop $P_2-P_3$ across orifice 14.

Flow into chamber 66 from valve 20 only matches out flow through restrictor 71 when the valve and restrictor areas are in a fixed relationship (approximately equal). Piston 53, therefore, can be in position equilibrium only when valve 20 is at the fixed null poition as determined by the selected metering pressure drop $P_2-P_3$ and the spring load on the valve diaphragm. Error in $P_2-P_3$ causes proportionate changes in flow into chamber 66 and proportionate rates of movement of piston 53 and convergent valve member 51. If extraneous force inhibits piston movement, it moves slower so that changes in flow into chamber 66 are reflected as (smaller) changes in flow through restrictor 71. Corresponding changes in $P_x-P_o$ from its nominal equilibrium valve develop piston force as needed to assure positive movement. For normal operation, if $P_2$ should increase without a corresponding increase in $P_3$, valve 20 closes somewhat and piston member 53 moves toward the right. Movement of member 53 toward the right increases the bypass flow through line 16, reducing the pressure $P_2$. As $P_2$ is reduced, valve 20 starts opening until the desired value of $P_2-P_3$ is restored. Controlling the pressure drop $P_2-P_3$ across orifice 14 by means of the integrating action of piston member 43 requires a relatively slow response of the system to transient pressure changes if instability is to be avoided. The resulting time lag is compensated for by the fast proportional response of tubular member 42.

Assuming again that an increase in $P_2$ occurs without a corresponding increase in $P_3$. Piston 43 moves rapidly toward the left increasing the bypass flow and reducing $P_2$. However, $P_2$ is not restored to its original value, otherwise piston 43 would return to its original position and the bypass flow would not be increased. Instead $P_2$ will assume some new value proportionately higher than the original value of $P_2$ but less than the disturbance in $P_2$ which triggered the change. This steady state error will then be eliminated by the slower responding integrating action of piston member 53.

In addition to the advantages of the invention in providing fast, accurate control of meter pressure, the invention affords improved reliability of operation. Again referring to FIG. 2, the various forces acting on members 42 and 53 are adjusted so that member 42 is centered in its permissible travel relative to member 53 at the desired $P_2-P_3$ pressure drop. During transients, member 42 moves briefly from its centered position, never more than $\pm\frac{1}{2}$ the available stroke of piston 54 as limited by stop 68. It returns to the centered position when member 53 moves to restore the desired pressure drop $P_2-P_3$. Should member 42 stick anywhere in its range of travel, member 53 can still move to provide the full range of variation in area between lip 52 and body 51, although dynamic response will be degraded. Should member 53 stick anywhere in its travel, member 42 can still move to provide a full range of valving action, but the accuracy of control of the pressure drop $P_2-P_3$ is degraded.

The invention claimed is:

1. A variable area flow ejector for use in a fluid delivery system, said system including a pump, a bypass conduit for returning a portion of the pump outlet flow to the inlet thereof and a metering orifice, comprising,
   a hollow ejector body;
   a tubular member movably mounted within said ejector body and having a terminating lip within the cavity of said ejector body;
   a convergent body movably mounted within the cavity of said ejector body, said convergent body being generally cylindrical in form with a convergent inner wall and being positioned with the larger diameter end thereof surrounding the exterior of said tubular member and the inner wall thereof converging toward said lip;
   means for admitting lower pressure fluid from a source to said tubular member to flow through said tubular member and be discharged from the lip end thereof;
   means connected to said bypass conduit for admitting higher pressure fluid from said pump outlet to flow into the larger diameter end of said convergent body and through the space separating said convergent wall from the exterior of said tubular member and be discharged into and merged with the flow from said tubular member;
   means for collecting the merged flow of said lower pressure fluid and said higher pressure fluid and for returning the same to said pump inlet;
   means for adjusting the position of said tubular member relative to said ejector body proportionately to a pressure drop existing across said metering orifice; and
   means for adjusting the position of said convergent body relative to said tubular member as a function of the time integral of the difference between the actual pressure drop across said orifice and a desired value of the pressure drop across said orifice.

2. An ejector as claimed in claim 1 wherein said means for adjusting the position of said tubular member include,
   a piston;
   means applying fluid at the pressure of fluid upstream of said orifice to one face of said piston;
   a spring acting on said piston to oppose the force of said fluid applied to said one face of said piston;
   means applying fluid at the pressure of fluid downstream of said orifice to the face of said piston opposing said one face to oppose the force of said fluid applied to said one face; and
   means coupling motion of said piston to said tubular member.

3. An ejector as claimed in claim 1 wherein said means for adjusting the position of said convergent body include,
   means for comparing the actual value of the pressure drop across said orifice with a desired value of the pressure drop across said orifice and for providing a small fluid flow signal having a flow related to the difference between said actual and said desired values;
   a piston;
   means applying said fluid flow signal to said piston to urge movement of said piston in a first direction;
   means applying said higher pressure fluid from said pump outlet to said piston to urge movement of said piston in a direction opposite said first direction; and
   means coupling motion of said piston to said convergent body to vary the position of said convergent body relative to said tubular member.

4. An ejector as claimed in claim 1 with additionally,
   means for admitting an additional flow of said lower pressure fluid to said ejector body in the vicinity of said merged flows from said tubular member and said convergent body for entrainment by and unification with said merged flows.

5. In a fluid delivery system having a fluid source, a pump, a metering orifice and a fluid bypass for returning a portion of the pump outlet flow to the inlet thereof, a variable flow ejector for controlling the bypass flow and for improving the recovery of the velocity head of the bypass flow as pressure head at the pump inlet, comprising,
   an ejector body;
   a cylinder formed in said body;
   means for admitting fluid from said source to one end of said cylinder;
   means for conducting fluid from the opposite end of said cylinder to the inlet to said pump;
   a first valve member slidably fitted in said cylinder to conduct fluid axially through said cylinder, said first valve member terminating in an open end within said cylinder;
   a second valve member slidably fitted in said cylinder, said second valve member including a body having open ends and a convergent inner wall and being positioned so that said inner wall surrounds said open end of said first valve member;
   a first piston secured to said first valve member and working within said cylinder;
   a second piston secured to said second valve member and working within said cylinder, said first piston, said second piston, and the inner wall of said second valve member body defining a first chamber having an outlet area which varies according to the position of said first valve member relative to said second valve member;
   a spring bearing on said first valve member to urge sliding of said first valve member in a first direction;
   means applying pressure corresponding to the pressure downstream of said orifice to urge sliding of said first valve member in said first direction;
   means applying pressure to said first piston corresponding to the pressure upstream of said metering orifice to urge sliding of said first valve member in the direction opposite said first direction;
   a second chamber having a variable volume defined in part by said second piston;

means providing a first control flow related to the desired pressure drop across said orifice;

means providing a second substantially constant flow out of said second chamber;

means applying said first flow to said second chamber to cause sliding movement of said second valve member opposite to said first direction at a rate proportional to the difference between said first and second flows; and means for admitting said bypass flow to said chamber for discharge through said variable area and entrainment and merger with flow from said open end of said first valve member.

6. A system as claimed in claim 5 with additionally, cooperating means on said first and said second valve members for limiting the relative travel of said first and second valve members.

7. A system as claimed in claim 5 with additionally,
means for admitting fluid from said source to said cylinder in the vicinity of said merged flow for entrainment by said merged flow.

8. A system as claimed in claim 5 wherein said means for conducting fluid from the opposite end of said cylinder includes a conduit having walls which diverge in the downstream direction to diffuse the flow therethrough thereby increasing the pressure at the inlet of said pump.

9. In a fluid delivery system including a pump, a metering orifice, the pressure drop across which is to be controlled, a bypass line for returning a variable amount of the pump outlet flow to the pump inlet and a source of fluid, a variable flow ejector for controlling the quantity of bypass flow and for recovering the energy thereof, comprising, an ejector body having a stepped cylinder therein formed by a smaller diameter section and a larger diameter section;

a first tube fixed in the end of said smaller diameter cylinder section and extending interiorly thereof;

a first valve member telescopingly fitted within said tube and extending coaxially with and terminating within said smaller diameter cylinder section;

a first piston formed integrally with said first valve member and extending between said first valve member and the wall of said smaller diameter cylinder section, one surface of said piston, a portion of the wall of said smaller diameter cylinder, the exterior of said first tube and the portion of the exterior of said first valve member adjacent said tube defining a first chamber;

a spring bearing on said first piston and tending to expand said first chamber;

a second tube extending from the exterior of said ejector body to the interior of said cylinder at the end of said larger diameter cylinder section;

a second valve member slidingly fitted on said second tube and extending within said cylinder, said second valve member including a body with a convergent inner wall surrounding the terminating end of said first valve member;

a second piston formed integrally with said second valve member and extending between said second valve member and the wall of said smaller diameter cylinder section, one surface of said second piston, the surface of said first piston facing said one surface of said second piston and portion of the wall of said smaller diameter cylinder section defining a second chamber having a variable exit area dependent upon the linear separation between said first and second valve members;

a third piston formed integrally with said second valve member and extending between said second valve member and the wall of said larger diameter cylinder section, one surface of said third piston, a portion of the wall of said larger diameter cylinder section and said second tube defining a third chamber;

means for admitting fluid from said source to said first tube;

means for applying a first fluid pressure to said first chamber corresponding to the pressure downstream of said orifice;

means admitting bypass flow to said second chamber, said bypass flow being discharged from said second chamber through said variable exit area and merging with flow through said first valve member, said merged flow being discharged from said convergent body and collected by said second tube;

means providing a second fluid flow corresponding to the pressure drop across said orifice;

means admitting said second fluid flow to said third chamber;

means providing a third fluid flow corresponding to said second fluid flow at the desired pressure drop across said orifice; and means for exhausting said third fluid flow from said third chamber.

10. An ejector as claimed in claim 9 with additionally, cooperating means on said first and on said second valve members for limiting travel of said valve members relative to one another.

11. An ejector as claimed in claim 10 wherein a surface of said third piston opposite said one surface of said third piston, a portion of the wall of said larger diameter cylinder section and a portion of the exterior of said second valve member define a fourth chamber, and with additionally, means for admitting fluid from said source to said fourth chamber; and means for discharging fluid from said fourth chamber into the stream discharged from said convergent body.

* * * * *